(12) United States Patent
Schimke et al.

(10) Patent No.: US 9,061,758 B2
(45) Date of Patent: Jun. 23, 2015

(54) NOISE AND PERFORMANCE IMPROVED ROTOR BLADE FOR A HELICOPTER

(75) Inventors: Dieter Schimke, Unterhaching (DE); Stefanie Link, Ottobrunn (DE); Sascha Schneider, Unterhacing (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 603 days.

(21) Appl. No.: 13/367,776

(22) Filed: Feb. 7, 2012

(65) Prior Publication Data

US 2012/0251326 A1    Oct. 4, 2012

(30) Foreign Application Priority Data

Mar. 31, 2011 (EP) ..................... 11400025

(51) Int. Cl.
*B64C 27/46* (2006.01)
*B64C 27/467* (2006.01)

(52) U.S. Cl.
CPC ............. *B64C 27/463* (2013.01); *B64C 27/467* (2013.01)

(58) Field of Classification Search
CPC ...... B64C 11/18; B64C 11/20; B64C 27/463; B64C 27/467
USPC .................................. 416/228, 238
See application file for complete search history.

(56) References Cited

U.S. PATENT DOCUMENTS

| | | | |
|---|---|---|---|
| 3,467,197 A | 9/1969 | Spivey | |
| 3,822,105 A | 7/1974 | Jepson | |
| 4,334,828 A * | 6/1982 | Moffitt | 416/228 |
| 5,035,577 A | 7/1991 | Damongeot | |
| 5,174,721 A * | 12/1992 | Brocklehurst | 416/223 R |
| 5,332,362 A | 7/1994 | Toulmay | |
| 6,000,911 A * | 12/1999 | Toulmay et al. | 416/223 R |
| 6,116,857 A * | 9/2000 | Splettstoesser et al. | 416/228 |
| 6,231,308 B1 * | 5/2001 | Kondo et al. | 416/228 |
| 7,845,911 B2 | 12/2010 | Karem | |
| 8,128,376 B2 | 3/2012 | Karem | |
| 2005/0158175 A1 * | 7/2005 | Falchero et al. | 416/223 R |
| 2006/0269418 A1 * | 11/2006 | Bagai et al. | 416/223 R |

FOREIGN PATENT DOCUMENTS

| | | |
|---|---|---|
| EP | 0482788 A1 | 4/1992 |
| EP | 0867363 A2 | 9/1998 |

(Continued)

OTHER PUBLICATIONS

Search Report and Written Opinion; Application No. FR EP 11400025; dated Sep. 13, 2011.

*Primary Examiner* — Dwayne J White
*Assistant Examiner* — Brian P Wolcott
(74) *Attorney, Agent, or Firm* — Brooks Kushman P.C.

(57) ABSTRACT

A noise reduced and performance improved rotor blade (1) for a helicopter. The blade has three aerodynamic sections (5, 6, 7) along the blade span between a leading edge (8) and a trailing edge (9). An inner rectangular or tapered section (5) next to a blade root for said blade's connection to a rotor hub rotating about a rotor axis of said helicopter. A middle section (6) is adjacent to the inner section (5) and opposed to the blade root. The middle section (6) is forward swept over a distance along the span of the blade (1). An outer section (7) lies between the middle section (6) and the blade tip (11). The outer section (7) is back swept along a further part of the span of the blade (1). The outer section (7) includes a parabolic shape towards the free end of the blade tip (11).

16 Claims, 3 Drawing Sheets

(56) References Cited

FOREIGN PATENT DOCUMENTS

| | | | |
|---|---|---|---|
| GB | 1247966 A | 9/1971 | |
| JP | 2002308192 A | 10/2002 | |
| WO | 2008091299 A2 | 7/2008 | |
| WO | 2008147376 A1 | 12/2008 | |

* cited by examiner

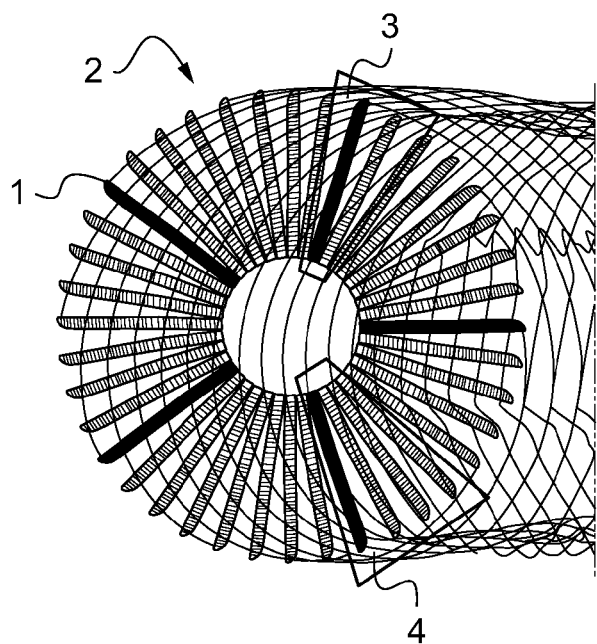
Fig.1
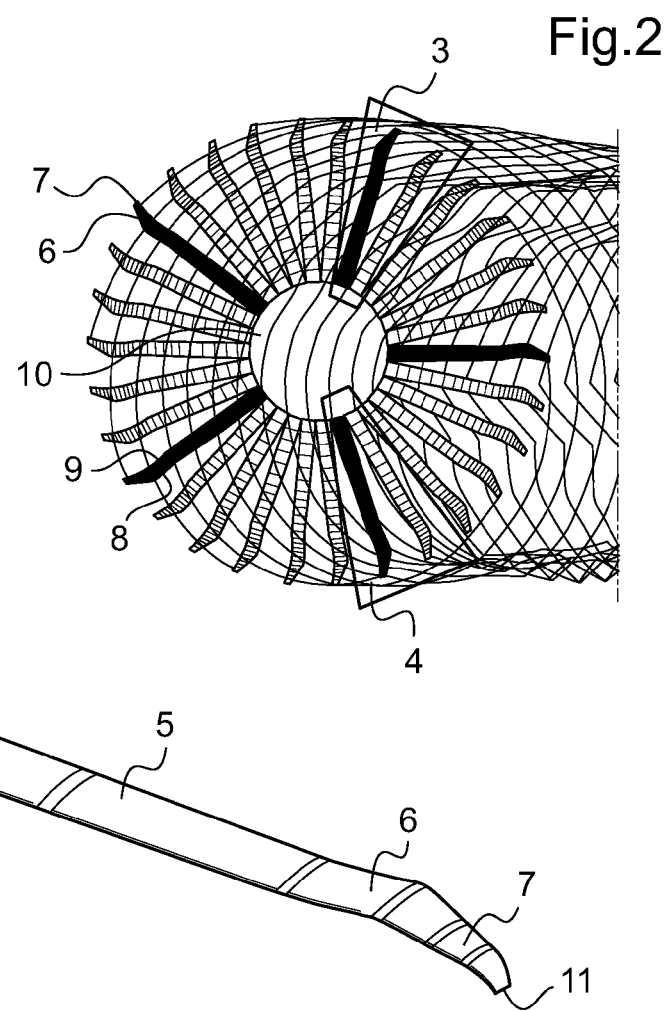
Fig.2
Fig.3

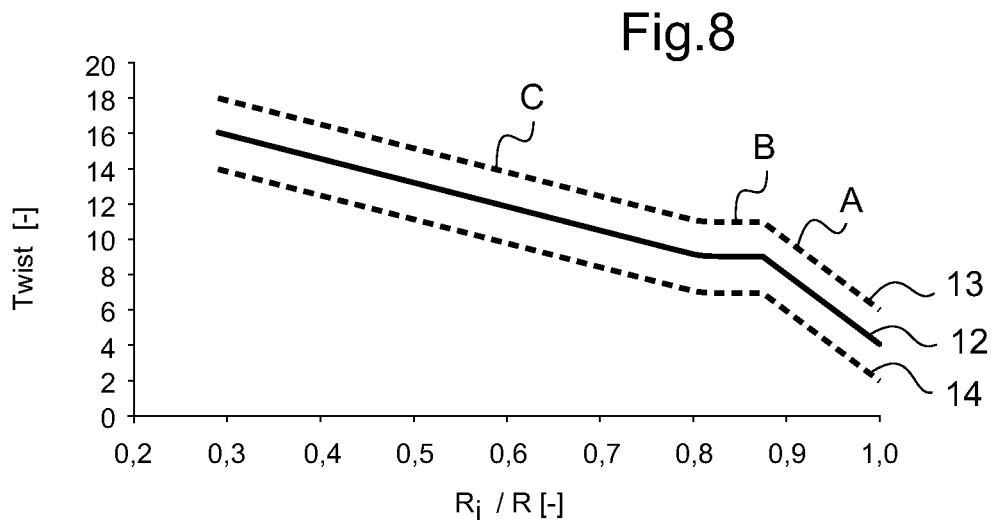
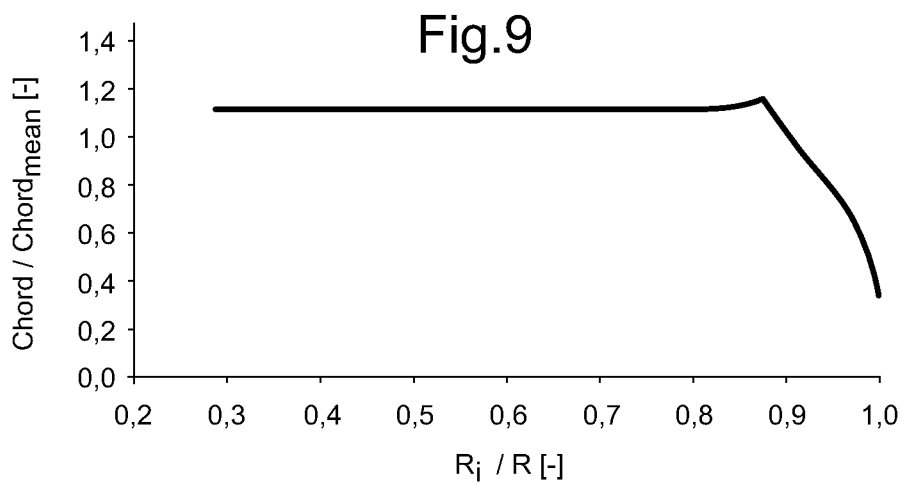
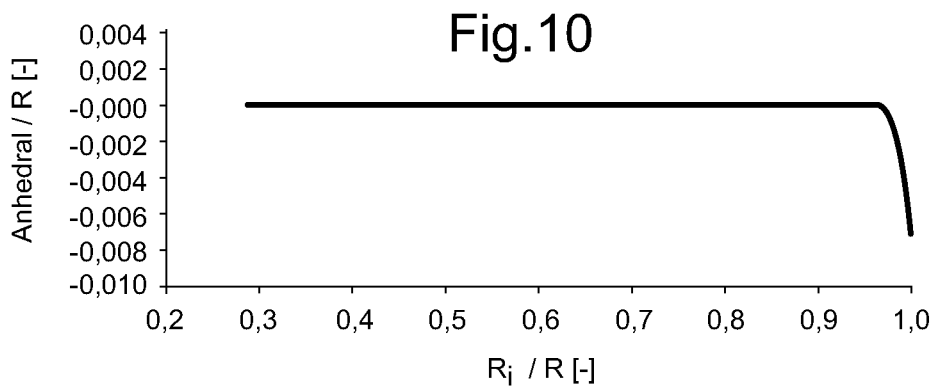

NOISE AND PERFORMANCE IMPROVED ROTOR BLADE FOR A HELICOPTER

CROSS REFERENCE TO RELATED APPLICATION

This application claims priority to European Application No. EP 11 400025.0 filed Mar. 31, 2011, the disclosure of which is incorporated in its entirety by reference herein.

BACKGROUND OF THE INVENTION (1) Field of the Invention

The present invention relates to a reduced noise and performance improved rotor blade for a helicopter, particularly a reduced noise and performance improved main rotor blade of an economic helicopter with the features of the preamble of claim 1.

(2) Description of Related Art

It is well known that the noise of helicopters in descent flight is dominated by the blade vortex interaction noise. The blade vortex interaction noise occurs when the rotor blade interacts with vortices generated by previous blades.

The document U.S. Pat. No. 5,035,577 proposes a nonlinear twist of the blade which consists in giving the outboard end of the blade, for example between 85 and 100% of the total radius of the blade R, an extra amount of twist. This has the effect of reducing the strength of the marginal vortex, or even of cancelling it, for a given amount of lift, so that the low-speed performance is improved and the noises of blade/vortex interactions during descent are attenuated. However, this arrangement does not make it possible to push back the limits of stalling, and the power savings decrease at high speed.

The document U.S. Pat. No. 5,332,362 proposes a radical increase in the amount of twist in a central region lying approximately between 45 and 80% of the span. A modification of this kind is aimed at improving the lift capability.

The document US 2005158175 A1 discloses a rotary wing blade of limited taper ratio, comprising in succession along a reference radius: an inner zone; a forward-swept zone; and a back-swept zone, where a zone is said to be swept "forwards" when its leading edge forms a positive angle relative to the axis of the blade, i.e. extends forwards in the direction of rotation of the rotor, and a zone is said to be swept "back" when its leading edge forms a negative angle. The beginning of said forward-swept zone is in the range 0.47 to 0.65 times the reference radius R of the rotary wing. The leading edge of the blade at the reference radius presents an angle gamma lying in the range −40° and −60° relative to a general axis of the blade.

The document U.S. Pat. No. 6,000,911 A discloses a rotor blade with an anhedral at its swept-back tip, said blade having a leading edge and a trailing edge and being formed of successive elemental cross sections identified by the distance r separating each of them from an axis of rotation, each having a defined chord profile and a center of pressure whose offset from the pitch-change axis, orthogonal to each of said sections, determines the sweep of said blade. Said blade is subdivided along its longitudinal length into four regions and its chord length L increases in a more or less linear manner in a first region, is at its maximum and constant in a second region, decreases linearly in a third region and decreases according to a parabolic function in a fourth region.

The document U.S. Pat. No. 6,116,857 A discloses a blade with a reduced sound signature for a helicopter main rotor and said document discusses the interaction of vortexes and rotor blades, generating an impulsive noise which can be very intense. The geometry of the rotor blade of said state of the art is optimised in order to reduce the noise emitted by a helicopter main rotor during certain flight phases, particularly in descent and in landing approach, phases of flight during which a significant noise source comes from the interaction of the rotor blades with the vortexes which they generate. Said disclosure is an integral part of the present application. Amongst other known means the document U.S. Pat. No. 6,116,857 A proposes for modifying the characteristics of the vortex at emission first known passive means consisting in slimming down the tip or the blade end, so as to displace the maximum local circulation toward the inside of the rotor, and different blade end shapes slimmed down on the chord have been proposed. A second known passive means according to the document U.S. Pat. No. 6,116,857 A consists in applying to the blade a twisting law leading to a weak blade tip circulation gradient, at the emission azimuths and another known passive means consist in adding a vertical aileron on the end profile of the blade tip in order to prevent or disrupt the rolling up of the vortex, or to add a spoiler on the leading edge at the blade end, in order to increase the viscous radius of the vortex. The document U.S. Pat. No. 6,116,857 A proposes a blade tip with a parabolic shape in plan.

The document EP 0482788 A1 discloses a flow separation behind the notch region of a swept tip of a helicopter rotor blade being reduced by features of the geometry and aerodynamic characteristics of the notch region itself. A forwardly swept leading edge portion extends at an angle between 30 degrees and 55 degrees from a reference line parallel to a blade pitch change axis and the leading edge of the aerofoil in the notch region incorporates blade droop.

The document EP 0867363 A2 discloses a root end attached to the rotor head for rotationally driving. The central portion has aerodynamic characteristics depending on the leading and trailing edges and which extend linearly from the root end in parallel to each other, and the chord dimension (C) therebetween. A planform shape of the blade tip portion is defined by the first leading edge which extends forwardly as the distance from the outboard end (P1) of the leading edge of the central portion outwardly increases, the second leading edge and the side edge which are rearwardly swept as the distance from the outboard end (P) of the first leading edge toward outboard side outwardly increases, the first trailing edge which is curved forwardly as the distance from an outboard end (P5) of the trailing edge of the central portion outwardly increases, and the second trailing edge which is swept rearwardly as the distance from the outboard end point (P6) of the first trailing edge outwardly increases. This configuration makes it possible to eliminate the delocalization in the supersonic region and greatly reduce high-speed impulsive noises.

The document GB 1247966 A discloses a rotatable airfoil with an inboard portion and an outboard swept portion which has a concave forward swept portion and a convex aft swept portion, the cosine of the acute sweep angle at each point along the outboard swept portion being inversely proportional to the radial distance r of that point from the axis of rotation. In a second embodiment, there is provided an additional outboard aft swept portion with a sweep angle of substantially 70 degrees. The leading edge of the airfoil is shaped to provide a corresponding angle of sweep in the line of minimum air pressure which is substantially parallel to the leading edge. The forward and aft sweeps delay the onset of "compressibility" problems and the additional sweep reduces tip vortex effect.

The document JP 2002308192 A discloses a rotor blade with an inner blade part having a front edge and a rear edge linearly extending in parallel from a base end part along a feathering axis F, an advance part having a parallel linear front edge and rear edge displacing frontward from the outer end of the front edge and the rear edge of the inner blade part respectively, and a retreat part having a parallel linear front edge and rear edge displacing rearward from the outer end of the front edge and the rear edge of the advance part respectively. A blade area Sf surrounded with the extension line of a ¼ chord line of the inner blade part, a ¼ chord line of the advance part, and a ¼ chord line of the retreat part and a blade area Sr surrounded with the extension line of the ¼ chord line of the inner blade part and the ¼ chord line of the retreat part are set to approximately equal to each other.

The document WO 2008091299 A2 discloses blades for rotorcraft designed and/or implemented with a swept portion that occupies at least 20-40% of a length of the blade. Forward and aft sweeps are contemplated, with up to 20 DEG or more of sweep. The swept portion preferably has a thickness ration of at least 10-20% at R80, and can have a tapered planform with a relatively outboard section having a smaller chord than a relatively inboard section. Contemplated design methods include optimizing or otherwise designing the rotor blade planform and lift distribution along the blade for efficiency in various flight conditions without taking into account the detrimental effects of high Mach numbers, and then using sweep angle, airfoil thickness and transonic airfoil shaping to maintain the lift distribution, low drag and low noise level at real Mach numbers at the various blade stations at the various flight conditions.

The document WO 2008147376 A1 discloses rotor blades pre-bent in at least one of a flap direction and a lag direction, wherein the pre-bent portion comprises at least 20-60% of the length of the blade. Preferred methods include analyzing the rotor dynamic behavior using computational methods, deciding on the operational case (rotor lift load, forward speed, etc.) in which the loads and vibration reductions are desired, and using the computed results to decide on an amount of pre-bending of the unloaded blade so that it comes closer to the feather axis under load. Another class of preferred methods models the bending of a first blade in flight loading conditions, and then designs a second blade having a pre-bend in approximately an equal in magnitude and opposite in direction to the bending. It is contemplated that such "pre-bent" blades can significantly reduce rotor loads and vibration levels of rotorcraft equipped with semi-rigid or rigid rotors.

The document US 2006269418 A1 discloses a main rotor blade exhibiting a unique planform shape in which the blade chord increases from the root end of the blade inboard region to the outer main region of the blade, where the blade chord achieves a maximum chord at a spanwise location within the main region, then decreases toward a distal tip end. The leading edge preferably is generally straight while the trailing edge is contoured to define the chord. Another characteristic feature of the rotor blade design is the location of the blade-feathering axis in which the feathering axis is located at a mid chord position over some inboard length of the rotor blade then transitions to a quarter chord location. Another characteristic feature is an airfoil distribution along the blade span that transitions from a blunt trailing edge to a sharp trailing edge airfoil suited for mid-range Mach number operation. The tip region preferably utilizes a transonic flow airfoil. Another characteristic feature of the rotor blade design is an unconventional combination of positive and negative twist gradients.

The document U.S. Pat. No. 3,822,105 A discloses a helicopter blade shaped to have a tip of selected twist, camber, planform, thickness distribution, sweep and airfoil so as to increase rotor operating efficiency, reduce rotor noise, and to reduce or eliminate rotor instability.

BRIEF SUMMARY OF THE INVENTION

The objective of the present invention is the improvement of the performance characteristics of a main rotor blade for a helicopter, especially in hovering flight, with simultaneously improving the aero-acoustics, especially reducing the blade vortex interaction noise in various descent flights.

The solution is achieved with a noise reduced and performance improved rotor blade with the features of claim 1. Preferred embodiments of the invention are presented with the subclaims.

According to the invention a noise reduced and performance improved rotor blade for a main rotor of a helicopter comprises three aerodynamic sections along the blade span, which are identified by their distance to the center of rotation. The inner section, next to the blade root and the connection to the rotor hub of the said main rotor and helicopter, is described by a rectangular or tapered shape, preferably rectangular. The second middle section adjacent to the inner section of the blade and opposed to the blade root is forward swept over a distance along the span of the blade and a third outer section between the middle section and the blade tip is back swept along a further distance of the span. Said outer section includes a parabolic shape of the leading edge towards the free end of the blade tip. The radius R of the blade span ranges between 5 m to 10 m. Said inner section extends from radii $R0$ to $R1$, $R0$ being in a range from $R0=0.29 \cdot R - 14\% \cdot R$ to $R0=0.29 \cdot R + 4\% \cdot R$ and $R1$ being in a range from $R1=0.8 \cdot R - 14\% \cdot R$ to $R1=0.8 \cdot R + 10\% \cdot R$, said middle section extends from said $R1$ to $R2$ with $R2$ being in a range from $R2=0.875 \cdot R \pm 10\% \cdot R$ and the outer section extends to the blade tip with a distance R from the rotor axis. The middle forward sweep section of the inventive rotor blade balances the outer backward sweep section to avoid high pitching moments and to avoid any increase of pitch link loads in comparison to established blades. Said forward-aft swept shape of the leading edge of the inventive noise reduced and performance improved rotor blade allows especially the reduction or avoidance of parallel interaction of the blade vortices in various descent flights of helicopters and with the additionally reduced vortex strength at the blade tip the inventive rotor blade provides a noise reduced economic helicopter for increased acceptance of helicopters in society. The inventive rotor blade uses a passive blade design approach with emphasis to two design points:

The performance characteristics of the inventive rotor blade are improved for a hovering flight in high altitude with maximum take off weight with only little performance penalty in forward flight.

The aero-acoustic design point is defined as a 6° descent flight at a flight speed of Vy (ICAO/FAA certification) with only little acoustic penalty at other descent angles and flight speeds and to influence the performance characteristics of the blade as little as possible.

The inventive noise reduced and performance improved main rotor blade takes into account a growing ecological awareness in society and the year 2020 goals of ACARE (Advisory Council for Aeronautics Research in Europe) and makes an important step towards an efficient and economic helicopter.

The inventive noise reduced rotor blade allows also a performance improvement of a helicopter in a hover flight condition by an optimized twist law, which leads to a shift of thrust from the outer to the inner blade section, a reduction of the intensity of the tip vortex and a minimization of the drag. The shift of thrust from the outer section to the inner section of the inventive noise reduced and performance improved rotor blade results also in a shift of drag resulting in a decreasing torque of the rotor. A further effect of said shift of thrust is the reduction of the intensity of the tip vortex with a positive effect to blade-vortex-interaction. The planform—synonym for the projected shape of a wing or rotor blade to a horizontal plane seen from the top—of the inventive noise reduced and performance improved rotor blade is optimized according to acoustic aspects but there is also consideration to the radial thrust and drag distribution and therefore to the performance. This negative effect of the forward-aft swept shape to the performance is minimized using a multi-linear twist law.

According to a further preferred embodiment of the invention respective shapes of a leading edge and a trailing edge of said middle section of the rotor blade are respectively defined by hermite polynomials. Said smooth transition between said inner section to the middle section minimizes the negative influence of the forward swept blade shape on the drag and therefore to the performance of the helicopter in hover flight condition.

According to a further preferred embodiment of the invention the shape of the leading edge of said outer section is essentially linear, with the parabolic shape from a radius $R3$ till towards the blade tip, said radius $R3$ being in a range from $R3 = 0.964 \cdot R - 10\% \cdot R$ to $R3 = 0.964 \cdot R + 2\% \cdot R$ of the rotor blade.

According to a further preferred embodiment of the invention the shape of the trailing edge of said outer section is preferable linear along its entire span.

According to a preferred embodiment of the invention an anhedral parameter is provided for the rotor blade to keep the distance between the vortices and the rotor blade as large as possible. The anhedral is the extent to which the rotor blade extends downward from a planform of the blade. The inventive rotor blade is provided with preferably a parabolic anhedral progress ranging till up to $0.015 \cdot R$ towards said blade tip allowing by control of the parameter anhedral to vary the position of the vortex in such a way that for any specified aero-acoustic design point the distance between the vortices and the inventive reduced sound rotor blade will be maximized.

According to a further preferred embodiment of the invention a distance D1 between a most forward swept point and a rearmost swept point of the rotor blade ranges between Chordmean<D1<Chordmean·3, where the Chordmean is given by:

$$Chord_{mean} = \frac{\int_{R0}^{R} Chord(y) \cdot y^2 \, dy}{\int_{R0}^{R} y^2 \, dy}$$

Chord(y) defines the variation of the chord along the radial direction y.

The Chordmean ranges between 250 mm to 1000 mm. A distance D2 between the leading edge of the inner rectangular or tapered section to the most forward swept point ranges between 0<D2<Chordmean·0.5.

According to a further preferred embodiment of the invention the twist of the rotor blade decreases in a multi-linear progression along the span of the rotor blade said twist being defined by the difference in angular setting between the two ends of the rotor blade. The reduction of the twist at the blade tip positively affects the generation of noise of the inventive reduced noise blade in descent flight. The vortex strength of the blade tip vortex will be reduced as a result of the unloaded blade tip. Thus the blade vortex interaction (BVI) will be attenuated and the BVI noise will be reduced.

According to a further preferred embodiment of the invention the twist of the inventive reduced sound rotor blade is multi-linear or non-linear, preferable non-linear, for the shift of thrust with a twist distribution in which the absolute value of the gradient at the outer blade part is enlarged in comparison to the inner blade part. Based on the reference twist law (defined as 12° from R0 to the blade tip) the upper and lower limit ranges between ±2°.

The invention will be described by way of a preferred embodiment with reference to the attached drawings.

BRIEF DESCRIPTION OF THE SEVERAL VIEWS OF THE DRAWINGS

FIG. 1 shows a top view of a 5-bladed rotor with rotor blades according to the state of the art, FIG. 2 shows a top view of a 5-bladed rotor with noise reduced rotor blades according to the invention, FIG. 3 shows a perspective view of a noise reduced and performance improved rotor blade according to the invention, FIG. 8 shows a reference function for the variation of the twist along the radius of the noise reduced and performance improved rotor blade according to the invention, FIG. 9 shows a variation of chord along the radius R of the noise reduced and performance improved rotor blade according to the invention, and FIG. 10 shows a variation of an anhedral line along the radius R of the noise reduced and performance improved rotor blade according to the invention.

DETAILED DESCRIPTION OF THE INVENTION

Figure 4:
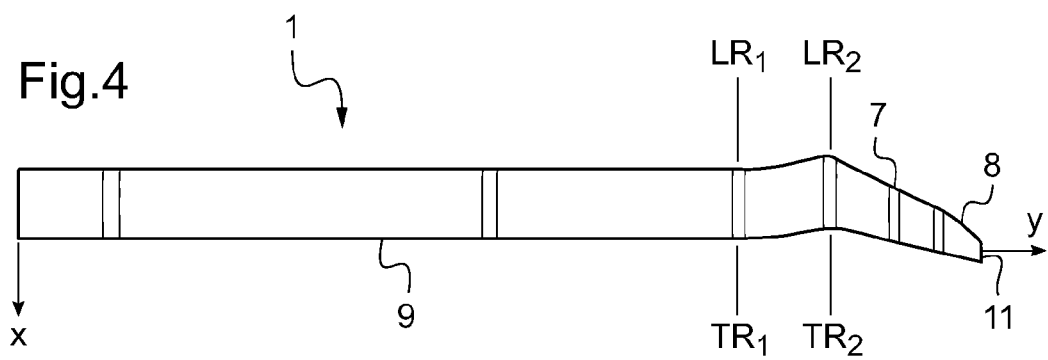
FIG. 4 shows a top view of the noise reduced and performance improved rotor blade according to the invention.

According to FIG. 1 known rotor blades 1 of a main rotor 2 of a helicopter (not shown) include an aerodynamically profiled main part, extending, along the blade chord, between a leading edge and a trailing edge, and, along the span of the blade, between a footing part equipped with a blade root for its connection to a rotor hub and a blade tip at its free end.

During rotor rotation, vortices are generated at the blade tip by the pressure difference between intrados and extrados at each blade tip. Vortices interact with the blades following the blade emission of vortices along the leading edges simultaneously in two cone shaped areas 3, 4. Such interactions appear at the advancing and retreating side of the rotor. Within the cone shaped areas 3, 4 the vortices cross the rotor plane and both at the advancing and retreating side the parallel vortex interaction are reduced compared to an established planform.

According to FIG. 2 corresponding features are referred to with the references of the FIG. 1. Noise reduced rotor blades 1 for helicopters comprise three sections 5, 6, 7 along the blade span between a leading edge 8 and a trailing edge 9, with an inner rectangular or tapered section 5, preferable rectangular, next a blade root 10 for said blade's connection to a rotor hub rotating about a rotor axis of said helicopter, a middle section 6 adjacent to the inner section 5 of the reduced sound rotor blade 1 and opposed to the blade root 10, said middle section 6 being forward swept over a distance along the span of the reduced sound rotor blade 1 and an outer section 7 between the middle section 6 and a blade tip, said outer section 7 being back swept along a further part of the span of the reduced sound rotor blade 1 and said outer section 7 including a parabolic shape towards the free end of the blade tip. The entire length of the reduced sound rotor blade 1 is in the range of R from the rotor axis to the blade tip 11. The reduced sound rotor blade 1 is made of composite material.

A reduced forward cone 4 of the reduced sound rotor blade 1 with blade vortex interactions is located in the first quadrant and the reduced backward cone 3 with the interactions is located in the fourth quadrant with azimuths between 270° and 360°.

According to FIG. 3, 4 the noise reduced and performance improved rotor blade 1 for helicopters comprises said three sections 5, 6, 7 along its span with their respective distances R1 to R3 from the rotor axis. The inner section 5 is rectangular or tapered, preferable rectangular, and extends from R0=0.29·R−14%·R to R0=0.29·R+4%·R to R1=0.8·R+10%·R to R1=0.8·R−14%·R. The inner section 5 is followed by a middle forward sweep section 6 which extends from R1 to R2 with R2 being in a range from R2=0.875·R±10%·R. The outer back swept section 7 extends from R2 to the blade tip 11 and includes a back swept part to the blade tip 11 with a parabolic form. The blade tip 11 has the distance R from the rotor axis of the main rotor. The radius R ranges between 5 m to 10 m.

The leading and trailing edges 8, 9 of the middle forward sweep section 6 are defined by hermite polynomials being defined as sum of four independent functions Qi.

$$f(t) = Q_1(t) + Q_2(t) + Q_3(t) + Q_4(t) \quad (1)$$

with each of said individual functions Qi for i=1-4:

$$Q_1(t) = x_n(2t^3 - 3t^2 + 1), \; Q_2(t) = x_{n+1}(-2t^3 + 3t^2), \quad (2)$$

$$Q_3(t) = \left(\frac{dx}{dy}\right)_n (t^3 - 2t^2 + t), \; Q_4(t) = \left(\frac{dx}{dy}\right)_{n+1} (t^3 - t^2)$$

and $$t = \frac{y - y_n}{y_{n+1} - y_n}$$

Figure 5:
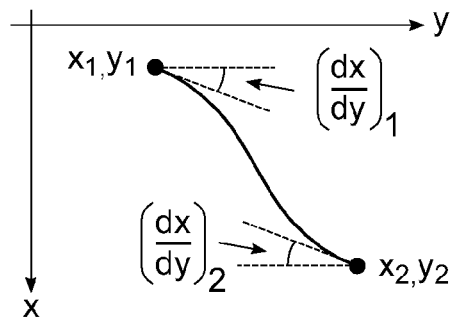
FIG. 5 shows the definition of the transition shape (hermite shape function) according to the invention.

According to FIG. 5 corresponding features are referred to with the references of the FIG. 1-4. The hermite polynom Qi(t) is represented defining the shape of the leading edge 8 of the noise reduced and performance improved rotor blade 1 for the smooth transition at LR1 from the inner section to the middle forward swept section of the leading edge of the sound reduced rotor blade. Corresponding hermite polynoms Qi(t) with i=1, 2, 3 or 4 define the smooth transition at TR1 from the inner section 5 to the middle forward swept section 6 of the trailing edge 9.

The respective slopes at the 2 transitions LR1, LR2 of the leading edge 8 and the 2 transitions at the trailing edge TR1, TR2 from the middle forward swept section 6 to the adjacent sections 5, 7 follow as:

| Edge | Section Border | Radius Position | Slope |
|---|---|---|---|
| Leading Edge | Left | LR1 | R1 | −0.05 (0.0 to −1.0) |
| Leading Edge | Right | LR2 | R2 | −0.2 (0.0 to −1.0) |
| Trailing Edge | Left | TR1 | R1 | −0.05 (0.0 to −1.0) |
| Trailing Edge | Right | TR2 | R2 | −0.15 (0.0 to −1.0) |

Figure 6:
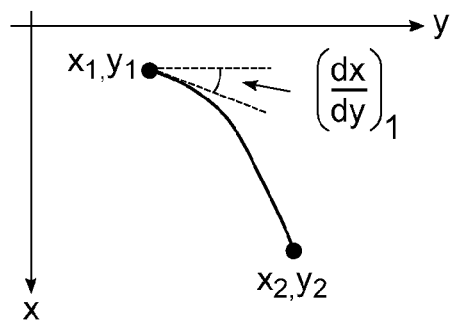
FIG. 6 shows a parabolic shape function according to the invention.

According to FIG. 6 the leading edge 8 of the outer back swept section 7 is essentially linear with a parabolic shape introduced at the blade tip 11. The parabolic shape starts at a radius position R3=0.964·R and is defined by the following function:

$$f_n(y) = \frac{\left(\left(x_{n+1} - \left(\frac{dx}{dy}\right)_n (y_{n+1} - y_n)\right) - x_n\right)}{(y_{n+1} - y_n)^2}(y - y_n)^2 + \left(\frac{dx}{dy}\right)_n (y - y_n) + x_n, \quad (3)$$

$$y \in [y_n, y_{n+1}]$$

A parabolic shape function according to equation 3 with a slope of 0.5 at n=1 is given for a parabolic shaped blade tip 11 at the outer section 7 of the sound reduced rotor blade 1, the trailing edge 9 of said outer section 7 being linear.

Figure 7:
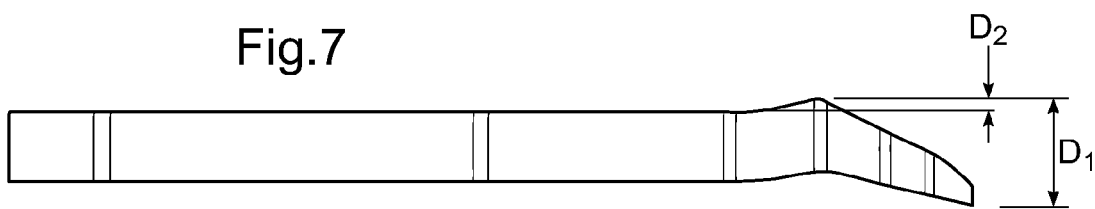
FIG. 7 shows distances between a most forward swept point and a most back swept point of the sound reduced rotor blade according to the invention.

According to FIG. 7 a distance D1 ranges between Chordmean<D1<Chordmean·3 between a most forward swept point and a most back swept point of the sound reduced rotor blade 1. The Chordmean ranges between 250 mm to 1000 mm. A distance D2 between the leading edge 8 of the inner rectangular or tapered section 5 to the most forward swept point ranges between 0<D2<Chordmean·0.5

According to FIG. 8 an reference function for the variation of the twist along the radius of the noise reduced and performance improved rotor blade 1 is represented in a reference multi-linear line 12 of three lines 12, 13 and 14 each representing a multi-linear twist function along the radius R of the noise reduced and performance improved rotor blade 1 with a minimum twist at the blade tip 11 and a maximum twist at the end of the inner section 5 of the sound reduced rotor blade 1 orientated towards the hub of the main rotor 2. Each of the three multi-linear twist functions 12, 13 and 14 are composed of three linear segments A, B and C, said segments A, B and C corresponding to the inner, middle and outer section 5, 6 and 7 of the noise reduced and performance improved rotor blade 1. The first linear segment A of the intermediate line 12 indicates a linear increasing twist from the blade tip 11 of the sound reduced rotor blade 1 towards R2, the twist function increases less steep according to a second linear segment B of the intermediate line 12 from R2 towards R1 at the forward swept middle section 6 and according to a third linear segment C of the multi-linear reference line 12 the maximum twist is reached at the end orientated towards the hub of the main rotor of the inner section 5 of the sound reduced rotor blade 1.

The twist function along the radius R of the noise reduced and performance improved rotor blade 1 may vary along the multi-linear reference line 12 between the upper and lower multi-linear lines 13, 14 above and below the reference multi-linear line 12 allowing modifications of the progression of the twist function along the radius R of the noise reduced and performance improved rotor blade 1 between a multi-linear to a completely non-linear shape within the bandwidth defined by the upper and lower multi-linear lines 13, 14. Based on the reference twist law represented by line 12 and defined as 12° variation from R0 to the blade tip, the upper and lower limit ranges between ±2°.

| Radius Position | Twist [°] | Bandwidth [°] |
|---|---|---|
| R0 | 16.00 | ±2.0 |
| R1 | 9.12 | ±2.0 |
| R2 | 8.91 | ±2.0 |
| Tip | 4.00 | ±2.0 |

According to FIG. 9 a variation of chord along the radius R of the noise reduced and performance improved rotor blade 1 is constant for the inner section 5 till R1, the chord is slightly increased in the middle section 6 till R2 and finally is reduced in the outer section 7 till the blade tip 11 of the noise reduced and performance improved rotor blade 1.

The chord at R2 ranges between C2=Chordmean and C2=Chordmean+50%.

According to FIG. 10 a variation of an anhedral line along the radius R of the noise reduced and performance improved rotor blade 1 is constant from the inner section 5 till R3 of the outer section 7 of the noise reduced and performance improved rotor blade 1, said anhedral line decreasing along the parabolic part in the outer section 7 till the blade tip 11 of the noise reduced and performance rotor blade 1.

The invention claimed is:

1. A noise reduced and performance improved rotor blade for a helicopter, comprising three aerodynamic sections along a blade span between a leading edge and a trailing edge, with an inner rectangular or tapered section, a blade root for connecting the blade to a rotor hub rotating about a rotor axis of the helicopter, a middle section adjacent to the inner section and opposed to the blade root, the leading edge of the middle section being forward swept over a distance along the blade span and the trailing edge of the middle section being forward swept over a distance along a corresponding span of the blade, and an outer section between the middle section and a blade tip, the outer section being back swept along a further part of the span of the blade, the inner section extending from radii R0 to R1, R0 being in a range from $R0=0.29 \cdot R - 14\% \cdot R$ to $R0=0.29 \cdot R + 4\% \cdot R$ and R1 being in a range from $R1=0.8 \cdot R + 10\% \cdot R$ to $R1=0.8 \cdot R - 14\% \cdot R$, the middle section extending from the R1 to R2 with R2 being in a range from $R2=0.875 \cdot R + 10\% \cdot R$ to $R2=0.875 \cdot R - 10\% \cdot R$, the outer section extending to the blade tip with a distance R from the rotor axis, the middle section and outer section having a twist decreasing in a multi-linear or non-linear progression along the span of the rotor blade, wherein R2 corresponds to a most forward-swept portion of the blade and the trailing edge throughout the outer section is linear.

2. The rotor blade according to claim 1, wherein the rotor blade has an anhedral parameter, with a parabolic anhedral magnitude increasing with blade span to at most $0.015 \cdot R$ towards the blade tip.

3. The rotor blade according to claim 1, wherein the shapes of a leading edge and a trailing edge of the middle section are respectively defined by hermite polynomials.

4. The rotor blade according to claim 1, wherein the leading edge of the outer section comprises a linear portion and a parabolic portion, the parabolic portion extending from a radius R3 towards the blade tip, R3 being in a range from $R3=0.964 \cdot R + 2\% \cdot R$ to $R3=0.964 \cdot R - 10\% \cdot R$.

5. The rotor blade according to claim 1, wherein a Chordmean ranges between 250 mm to 1000 mm, a distance D1 ranges between Chordmean<D1<Chordmean·3 between a most forward swept point and a rearmost swept point of the rotor blade and a distance D2 between the leading edge of the inner rectangular or tapered section to the most forward swept point ranges between 0<D2<Chordmean·0.5.

6. The rotor blade according to claim 1, wherein a chord at R2 ranges between C2=Chordmean and C2=Chordmean+50%.

7. A helicopter rotor blade having a span extending from a blade root to a blade tip with a blade radius R and having a leading edge, a trailing edge, and a mean chord, the blade comprising:
    an inner section with a rectangular or tapered planform shape and extending from a first radius R0 to a second radius R1, R0 being between 0.15R and 0.33R and R1 being between 0.66R and 0.9R;
    a middle section adjacent to the inner section and extending from R1 to a third radius R2, R2 being between 0.775R and 0.975R, wherein in the middle section a portion of the leading edge is forward swept and a corresponding portion of the trailing edge is forward swept, R2 corresponding to a most forward-swept portion of the blade; and
    an outer section adjacent the middle section and extending from R2 to the blade tip, wherein a portion of the outer section is backward swept, wherein the trailing edge throughout the outer section is linear, and wherein a distance between a most forward-swept portion and a most rearward-swept portion of the blade is between one and three times the mean chord.

8. The helicopter rotor blade of claim 7, wherein the blade has a twist profile in the middle section and outer section that decreases in a multi-linear or non-linear function with the span.

9. The helicopter rotor blade of claim 7, wherein the blade has a parabolic anhedral profile with an anhedral value at the blade tip being at most $0.015 \cdot R$.

10. The helicopter rotor blade of claim 7, wherein in the outer section the leading edge includes a linear portion and a parabolic portion, the parabolic portion extending from a fourth radius R3 to the blade tip, R3 being greater than R2 and between 0.864R and 0.984R.

11. The helicopter rotor blade of claim 7, wherein at R2 the blade has a chord that is between 1 and 1.5 times the mean chord.

12. A rotor blade having a span extending from a blade root to a blade tip with a blade radius R and having a leading edge, a trailing edge, a mean chord, and a blade twist profile, the blade comprising:
    an inner section extending from a first radius R0 to a second radius R1, R0 being between 0.15R and 0.33R and R1 being between 0.66R and 0.9R;
    a middle section adjacent to the inner section and extending from R1 to a third radius R2, R2 being between 0.775R and 0.975R, wherein in the middle section a portion of the leading edge is forward swept and a corresponding portion of the trailing edge is forward swept; R2 corresponding to a most forward-swept portion of the blade and
    an outer section adjacent the middle section and extending from R2 to the blade tip, wherein a portion of the outer section is backward swept, wherein the trailing edge throughout the outer section is linear and wherein the blade twist profile in the middle section and outer section twist decreases in a multi-linear or non-linear function with the span.

13. The rotor blade of claim 12, wherein a distance between the most forward-swept portion and a most rearward-swept portion of the blade is between one and three times the mean chord.

14. The rotor blade of claim 12, wherein the blade has a parabolic anhedral profile with an anhedral value at the blade tip being at most 0.015R.

15. The rotor blade of claim 12, wherein in the outer section the leading edge includes a linear portion and a parabolic portion, the parabolic portion extending from a fourth radius R3 to the blade tip, R3 being greater than R2 and between 0.864R and 0.984R.

16. The helicopter rotor blade of claim 7, wherein a distance between a most forward-swept portion and a most rearward-swept portion of the blade is between one and three times the mean chord.

* * * * *